(12) United States Patent
Dean

(10) Patent No.: US 7,157,508 B2
(45) Date of Patent: Jan. 2, 2007

(54) POLYMER-LINKED ASPHALT COMPOSITIONS

(75) Inventor: David M. Dean, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 444 days.

(21) Appl. No.: 10/824,015

(22) Filed: Apr. 14, 2004

(65) Prior Publication Data

US 2004/0249025 A1     Dec. 9, 2004

Related U.S. Application Data

(60) Provisional application No. 60/476,873, filed on Jun. 6, 2003.

(51) Int. Cl.
*C08L 95/00*     (2006.01)
(52) U.S. Cl. .............................. 524/68; 524/59; 524/60; 524/69
(58) Field of Classification Search ............ 524/59–60, 524/68–69
See application file for complete search history.

(56) References Cited

U.S. PATENT DOCUMENTS

| | | | |
|---|---|---|---|
| 3,933,204 A * | 1/1976 | Knapp | ........................ 166/295 |
| 4,070,532 A | 1/1978 | Hammer | |
| 4,139,511 A * | 2/1979 | Hayashi et al. | ............. 523/450 |
| 4,301,051 A | 11/1981 | Marzocchi et al. | |
| 4,360,615 A * | 11/1982 | Wang et al. | .................... 524/9 |
| 4,451,598 A | 5/1984 | Decroix | |
| 4,650,820 A | 3/1987 | Decroix | |
| 4,822,427 A | 4/1989 | Graf et al. | |
| 5,306,750 A | 4/1994 | Goodrich et al. | |
| 6,117,926 A | 9/2000 | Engber et al. | |

FOREIGN PATENT DOCUMENTS

DE      19502371 A1     8/1996
WO      WO 03/002671 A1     1/2003

OTHER PUBLICATIONS

PCT International Search Report for International application No. PCT/US2004/017587 dated Oct. 13, 2004.
Henry Lee, Kris Neville, Handbook of Epoxy Resins, 1967, pp. 11-14, McGraw-Hill Book Company, New York.
Henry Lee and Kris Neville, Epoxy Resins, 1957, pp. 35-36, McGraw-Hill Book Company, Inc., New York.

* cited by examiner

*Primary Examiner*—Peter Szekely

(57) ABSTRACT

Disclosed are a thermoplastic polymer-linked-asphalt composition and a process for making a thermoplastic polymer-linked-asphalt. More particularly, the present invention relates to the reaction and resultant linking of a combination of epoxide-containing polymers and anhydride-containing polymers to asphalt to form a polymer-linked-asphalt composition having higher softening points. The improved polymer-linked-asphalt product is particularly useful in roofing applications.

10 Claims, No Drawings

POLYMER-LINKED ASPHALT COMPOSITIONS

CROSS-REFERENCE TO RELATED APPLICATIONS

Applicant claims the benefit of priority to provisional application 60/476,873 filed Jun. 6, 2003; herein incorporated by reference in its entirety.

BACKGROUND OF THE INVENTION

1. Field of the Invention

This invention relates to the reaction of asphalt and polymers to produce an improved polymer-linked-asphalt product. More particularly, the present invention relates to the reaction and resultant linking of a combination of epoxide-containing polymers and anhydride-containing polymers to asphalt forming a polymer-linked-asphalt composition having unique properties. The improved polymer-linked-asphalt product is particularly useful in roofing applications.

2. Description of the Related Art

The use of polymers as additives to asphalt (bitumen) is well known in the art. See for example U.S. Pat. Nos. 4,650,820 and 4,451,598, both incorporated herein by reference, wherein terpolymers derived from ethylene, an alkyl acrylate and maleic anhydride are mixed with bitumen. Also, see for example U.S. Pat. Nos. 5,306,750 and 6,117,926, both incorporated by reference, wherein reactant epoxy-functionalized, particularly glycidyl-containing, ethylene terpolymers are mixed and reacted with bitumen and, preferably (as taught in U.S. Pat. No. 6,117,926) with a catalyst to accelerate the rate of reaction and reduce the cost of the modified system.

Also disclosed in a trade brochure by ORKEM is the use of terpolymers prepared from ethylene, an alkyl acrylate and either maleic anhydride or glycidyl methacrylate as enhancement additives for bitumen and tar.

U.S. Pat. No. 4,301,051 discloses a chemically modified asphalt prepared by first reacting an asphalt with (1) a polymerizable vinyl aromatic monomer and (2) a rubbery polymer, and then reacting the product with a cross linking agent. The cross linking agents disclosed include organic polyisocyanates, polyepoxide monomers having molecular weights in the range from of 140 (RD4) to 420 (Araldite 508) and organic polycarboxylic acids or anhydrides.

Polymer-linked-asphalt compositions wherein the polymer modifiers include a reactant ethylene/alkyl acrylate/glycidyl methacrylate terpolymer and a high density polyethylene (HDPE)/maleic anhydride graft copolymer are described in PCT Patent Application Publication WO03/002671.

While it is possible to produce useful polymer-modified asphalt using the processes described in these references there is still a need for polymer-modified asphalt with improved high temperature resistance as well as improved elasticity at both ambient and low temperatures. There is also a need to provide polymer-modified asphalt that has good toughness and tenacity.

Asphalt is used in a variety of waterproofing and roofing applications. An important property of an asphalt roofing material is its softening point at elevated temperatures. Higher temperature softening points provide a more mechanically durable surface (for example, resistance to penetration or deformation caused by weight on the roofing surface) particularly when the material is at an elevated temperature.

Also, new performance criteria are continually sought by various construction and roofing practitioners, necessitating the development of improved asphalt products.

BRIEF SUMMARY OF THE INVENTION

One object of the present invention is to provide improved asphalt-containing products having enhanced performance properties particularly at low polymer concentrations. In particular, by using a reactive copolymer having a high glass transition temperature ($T_g$) and a reactive comonomer together with a reactant glycidyl-containing ethylene copolymer, asphalt-containing products having higher softening points (e.g. above 85° C.) can be prepared.

Other objects will be readily apparent to those skilled in the art from a reading of this specification.

Accordingly, this invention provides a polymer-linked-asphalt composition derived from treating asphalt with a reactant epoxy-containing ethylene copolymer and a reactant polystyrene-maleic anhydride copolymer wherein the cumulative polymer content of said polymer-linked-asphalt composition is from 0.05 to 20 weight percent relative to the total weight of the composition.

DETAILED DESCRIPTION OF THE INVENTION

It has been previously described that treating asphalt with certain reactive polymers provides for their reaction and linkage with the asphalt. The resulting reaction product is a polymer-linked-asphalt having superior properties to unmodified asphalt. The term "polymer-linked-asphalt" as used herein refers to a polymer and asphalt composition in which the polymer(s) therein are substantially covalently bound to asphalt by one or more covalent bonds and the phrase "treating asphalt with a reactant epoxy-containing ethylene copolymer and a reactant polystyrene-maleic anhydride copolymer" as used herein refers to the reaction producing the covalent bonds. The product polymer-linked-asphalt of the present invention provides a number of important performance characteristics, including reduced deformation and degradation caused by mechanical pressure at elevated temperatures.

The reactant asphalt and polymer, the reaction conditions, and the resulting polymer-linked-asphalt product are described below.

Reactant Asphalts

All types of asphalts (bitumens) are useful in this invention whether they are natural or synthetic. Representative asphalts include native rock, lake asphalts, petroleum asphalts, airblown asphalts, cracked asphalts or residual asphalts. Asphalts can be used containing a wide range of asphaltenes including asphalts containing more than 7 weight percent asphaltenes and typically more than 10 weight percent asphaltenes. Generally, the asphalts useful in this invention will contain less than 5 weight percent oxygen compounds and frequently less than 1 weight percent oxygen compounds. Also, the asphalts useful in this invention will be soluble in organic solvents commonly used to dissolve asphalt.

Preferred asphalts have a viscosity range (measured at 60° C.) of from 100 to 20,000 poise, preferably from 200 to 10,000 poise, more preferably from 300 to 4000 poise and still more preferably from 400 to 1500 poise.

Reactant Epoxide-Containing Polymers

Reactant epoxide-containing polymers useful in the present invention contain epoxide moieties (oxiranes) that react with the asphalt. The epoxide moiety comprises a cyclic structure consisting of two saturated carbon atoms and an oxygen atom. Typically, the reactant epoxide-containing polymers useful in this invention will have a melt flow index as determined by ASTM D1238-65T, Condition E, in the range from of from 0.1 to 200 (molecular weight 1,000,000 to 10,000), preferably 0.5 to 500 (molecular weight 650,000 to 25,000) and more preferably 1 to 100 (molecular weight 400,000 to 40,000). Typically, the reactant polymer will contain 0.01 or more weight percent epoxide moieties and preferably more than 0.04 weight percent epoxide moieties based on the total weight of the reactant polymer. More preferably the reactant polymer will contain 0.05 to 10 weight percent epoxide moieties and still more preferably 0.1 to 5 weight percent epoxide moieties based on the total weight of the reactant polymer.

Reactant polymers may be copolymers derived from two or more monomers (such as tetrapolymers), preferably three monomers (terpolymers) or two monomers (dipolymers).

Other reactant epoxy-containing polymers include epoxidized acrylic rubbers (for example, copolymers of ethyl or butyl acrylate functionalized with glycidyl methacrylate), epoxidized neoprene, epoxidized polyisoprene, epoxidized oils (for example, soya oil), epoxidized stryene-butadiene rubbers, epoxidized butadiene resins, epoxidized terpolymers (e.g., EPDM), epoxidized polynorbornene, and epoxidized butadiene-acrylonitrile rubbers.

A preferred group of epoxide-containing reactant polymers for use in the present invention are glycidyl-containing polymers (i.e. polymers containing moieties derived from 2,3-epoxy-1-propanol). Glycidyl-containing ethylene copolymers and modified copolymers useful in the present invention are well known in the polymer art and can readily be produced by the concurrent reaction of monomers in accordance with U.S. Pat. No. 4,070,532, the entire disclosure of which is incorporated herein by reference. Generally useful glycidyl-containing reactant polymers will contain 0.02 or more weight percent glycidyl moieties and more preferably 0.08 weight percent or more weight percent glycidyl moieties based on the total weight of the reactant polymer. More preferably the reactant polymer will contain 0.1 to 20 weight percent glycidyl moieties and still more preferably 0.2 to 10 weight percent glycidyl moieties based on the total weight of the reactant polymer.

More preferred reactant copolymers useful in this invention may be represented by the formula E/X/Y/Z, where E is the copolymer unit —(CH$_2$CH$_2$)— derived from ethylene; X is the copolymer unit —(CH$_2$CR$^1$, R$^2$)—, where R$^1$ is hydrogen, methyl, or ethyl, and R$^2$ is carboalkoxy, acyloxy, or alkoxy of 1 to 10 carbon atoms (X for example is derived from alkyl acrylates, alkyl methacrylates, vinyl esters, and alkyl vinyl ethers); and Y is the copolymer unit —(CH$_2$CR$^3$R$^4$)—, where R$^3$ is hydrogen or methyl and R$^4$ is carboglycidoxy or glycidoxy (Y for example is derived from glycidyl acrylate, glycidyl methacrylate, or glycidyl vinyl ether). Additional copolymer units Z are derived from comonomers including carbon monoxide, sulfur dioxide, acrylonitrile, or other monomers.

For this preferred embodiment of the invention, useful E/X/Y/Z copolymers are those wherein X is from 0 to 50 weight % of said E/X/Y/Z copolymer, Y is from 0.5 to 15 weight % of said E/X/Y/Z copolymer, and Z is from 0 to 15 weight % of said E/X/Y/Z copolymer, E being the remainder.

Reactant copolymers of note are E/X/Y copolymers wherein X is from 0 to 40 weight % of said E/X/Y copolymer, Y is from 1 to 10 weight % of said E/X/Y copolymer, E being the remainder.

Copolymers also of note are E/Y copolymers, where the weight percent of Y varies from 1 to 10 weight % of the copolymer, and E is the remainder.

It is also preferred that the epoxide-containing monomers, and more preferably the glycidyl-containing monomers, are incorporated into the reactant polymer by the concurrent reaction of monomers and are not grafted onto the reactant polymer by graft polymerization.

A particularly preferred epoxide-containing polymer is a terpolymer derived from copolymerization of ethylene, an alkyl acrylate and glycidyl methacrylate. A preferred alkyl acrylate for use in this terpolymer is n-butyl acrylate. Thus, a particularly preferred reactant glycidyl-containing ethylene copolymer is an E/X/Y copolymer derived from copolymerization of ethylene (E), n-butyl acrylate (nBA) and glycidyl methacrylate (GMA).

Reactant Polystyrene/Maleic Anhydride Copolymers

Polystyrene (PS)/maleic anhydride (MAH) copolymers are well known in the polymer art. Of note are copolymers containing 0.5 to 40 weight % MAH, alternatively 3 to 20 weight % MAH, alternatively 5 to 15 weight % MAH. These copolymers have a melt index (MI) between 0.1 and 10,000 measured by ASTM D1238 at 230° C. using a weight of 2.16 kg and have average molecular weights (Mw) in the range from about 4,000 to about 1,000,000. Of particular note is a PS/MAH copolymer with 7 weight % MAH that has a Mw of 224,000 and a MI of 1.7. This copolymer is available as catalog number 42, 694–6 from Aldrich, Milwaukee, Wis.

The Reaction Conditions

The asphalt and reactant polymers are combined under conditions suitable to cause reaction and linking of the reactant polymer to the asphalt. Suitable conditions will vary greatly depending upon the particular asphalt and reactant polymers chosen and the desired properties of the product polymer-linked-asphalt. Conditions under which the reaction occurs, i.e., time, temperature, type and quantity of each reactant can be determined empirically.

It has been found that mixing of the reactant polymer and the asphalt alone does not produce sufficient reaction to dramatically improve the functional properties of the resultant asphalt mixture. Elevated temperature, sufficient time and/or added catalytic materials are required for the reaction of the reactant polymers and asphalt to occur. This is in contrast to many prior art polymer-modified asphalts wherein some polymer is blended with asphalt as an additive without the polymer ever substantially reacting with the asphalt. In the present invention the polymer-linked-asphalt product is formed by the covalent reaction of the reactant epoxide-containing polymer and reactant polystyrene-maleic anhydride copolymer with asphalt.

Generally a reaction temperature of greater than 100° C. and commonly greater than 135° C. is required along with a reaction time of greater than 1 hour and commonly greater than 3 hours. Typically the reaction temperature will be in the range from 125 to 250° C. with a reaction time in the range from 2 to 300 hours. Preferably the reaction temperature will be in the range from 150 to 230° C. with a reaction time in the range from 3 to 48 hours. Still more preferably the reaction temperature will be in the range from 180 to 220° C. with a reaction time in the range from 4 to 24 hours.

Generally the reaction will take place at atmospheric pressure. Higher or lower pressures can be used but are generally less economical. Also the reactants will generally be continuously mixed during the reaction.

The reactant polymers and the asphalt reactant are combined such that the reactant polymers comprise 0.05 to 20 weight percent of the reaction mixture. Preferably the reactant polymers comprise 1 to 10 weight percent and more preferably 1 to 7 weight percent. Of note are polymer-linked-asphalt compositions of this invention wherein the reactant epoxy-containing ethylene copolymer comprises 1 to 4 weight percent of the reaction mixture, particularly 2 to 3 weight percent of the reaction mixture. Also of note are polymer-linked-asphalt compositions of this invention wherein the reactant polystyrene-maleic anhydride copolymer comprises 1 to 4 weight percent of the reaction mixture, particularly 2 to 3 weight percent of the reaction mixture.

It has been found that both the quantity of reactant polymers and the epoxide and/or anhydride content of the reactant polymers, within the limits described above, are critical to achieve desirable polymer-linked-asphalt rheology and to avoid gelation of the polymer-linked-asphalt. It has been found that it is preferable to select the reactants and reaction conditions so that substantially all of the epoxide moieties and substantially all of the anhydride moieties are reacted within the polymer-linked-asphalt product.

It is also desirable that the reaction of the epoxide-containing polymer and the asphalt can occur within an oil-in-water emulsion. In other words, the desired polymer-linked-asphalt product can develop as the reaction goes to completion within the emulsified particles. Generally, a reaction accelerating catalyst will be utilized to accelerate the reaction at normal emulsion storage temperatures in the range from of 20° C. to 100° C.

One advantage of emulsifying a blend of reactive polymers and asphalt is that emulsification is more readily accomplished in the unreacted state. It is easier to emulsify the lower viscosity unreacted polymer/asphalt blend than it is to emulsify the higher-viscosity reacted polymer-linked-asphalt. A second advantage is that by permitting the polymer/asphalt reaction to occur within the emulsified asphalt particle, it is possible to use higher levels of reactive polymers than is practical in normal roofing and paving asphalts. This is because the viscosity of oil-in-water emulsions is not dependent on the oil-phase (e.g., polymer-linked-asphalt phase) viscosity. Lower viscosity emulsions also allow for easier spreading of the asphalt over a surface, leading to better and more uniform coverage (larger area per volume of emulsion).

Asphalt emulsions are well known in the roofing and paving art. Emulsions of this embodiment of the current invention comprise water, asphalt, reactive polymers, and surfactants. Generally, the asphalt and reactive polymers will be blended just prior to their emulsification and before any significant reaction has occurred. The reaction of the reactive polymers and asphalt will occur within the oil phase of the emulsion.

A typical emulsion will comprise:

(a) 35 to 80 wt. % asphalt (preferably 60 to 75 wt. %);

(b) 0.05 to 20 wt. % reactive polymers (preferably 0.5 to 5 wt. %);

(c) 0.05 to 5.0 wt. % surfactant (preferably 0.5 to 2.0 wt. %); and (d) water to make 100%.

Alternatively, emulsions are made after the reaction of the polymer and asphalt by emulsifying the polymer-linked-asphalt with water and surfactants.

A typical emulsion will comprise:

(a) 35 to 85 wt. % polymer-linked-asphalt, preferably 60 to 75 wt. %, and more preferably 65 to 70 wt. %; wherein the polymer-linked-asphalt contains 0.05 to 20 wt. % reactive polymers;

(b) 0.05 to 5.0 wt. % surfactant, preferably 0.1 to 4.0 wt. %, and more preferably 0.2 to 2.0 wt. %; and (d) water to make 100%.

The surfactant utilized in the emulsions described above can be any of the well-known ionic and non-ionic emulsifying agents used in the roofing art. See, for example, U.S. Pat. No. 4,822,427, the entire disclosure of which is incorporated herein by reference. Salts of either fatty acids or amines are well-known ionic emulsifiers. Particularly well-known emulsifiers are salts of diamines and tall oil. Preferably catalysts will be included in the emulsion formulation to accelerate the polymer-linked asphalt reaction at normal emulsion storage temperatures. Other additives that can be utilized in the emulsions are well known in the art, such as petroleum solvents and the like (0.5 to 15 wt %), and emulsion viscosity modifiers.

It is desirable that polymer-modified emulsions made after the reaction of the polymer and asphalt as described herein are stable and have a fine particle size distribution. Preferably the emulsions will have a mean particle size of less than 30 microns, preferably less than 20 microns and more preferably less than 10 microns.

The Polymer-Linked-Asphalt Reaction Product

The product of the reaction of the present invention is a novel thermoplastic polymer-linked-asphalt. The term "polymer-linked-asphalt" refers to a polymer and asphalt composition in which the polymer is substantially covalently bound to asphalt by one or more covalent bonds formed by reaction of asphalt with one or more epoxide and/or anhydride moieties initially present in the reactant polymers. By the term "thermoplastic" it is meant that the polymer-linked-asphalt product softens when exposed to heat and returns to substantially its original condition when cooled.

The exact mechanism of the linking of the reactant polymers and asphalt in effecting the improved polymer-linked-asphalt product is unknown, but it is not necessary to know the mechanism in order to understand the present invention. However, without being bound by the theory, it is believed that the epoxide and anhydride moieties react with nucleophilic sites in the asphalt (e.g., carboxylic acid, pyrrolic or phenolic functional groups) to covalently bond (link) the polymer and the asphalt. Furthermore, reaction of an epoxide moiety with a nucleophilic site provides, in turn, a nucleophilic hydroxyl moiety that may react with an anhydride moiety of the polystyrene/maleic anhydride dipolymer to provide an amount of cross-linking between the asphalt and the two polymer modifiers. Whereas simple mixing of polymers into asphalt can introduce an elastic structure through the molecular entanglement of the polymer molecules within the asphalt, reacting the polymers onto the existing molecules in the asphalt, as taught in this invention, results in more effective use of the polymers and a substantial improvement in the asphalt's softening point.

The formation of the polymer-linked-asphalt composition of the present invention can be measured by an increase in reactant asphalt viscosity.

A second indicator of an effective polymer-linked-asphalt product of the present invention is a substantially storage stable viscosity. By "storage stable viscosity" it is meant that after completion of the reaction time there is no evidence of gelation and the viscosity of the product does not increase by a factor of 4 or more during storage at 163° C. for 10 days.

Preferably the viscosity does not increase by a factor of 2 or more during storage at 163° C. for 10 days. More preferably the viscosity increases less than 25% during 10 days of storage at 163° C.

A substantial increase in viscosity while the asphalt is stored is not desirable due to the resulting difficulties in handling the product and meeting and maintaining product specifications at the time of sale and use.

Another indicator of an effective polymer-linked-asphalt product of the present invention, in addition to storage stable viscosity, is homogeneity. Homogeneity of the polymer-linked-asphalt product is evidenced by there being no observation of phase separation or the formation of a surface "skin" in samples stored at 177° C. (350° F.) typically for 72–96 hours after completion of the reaction time.

Other Additives and Modifications

Reaction controlling agents, such as catalysts and quenching agents, can be used to accelerate, decelerate or terminate the reaction of the epoxide and/or anhydride moieties in the reaction mixture.

Many catalysts can be used for accelerating the reactive polymers/asphalt reaction rate. Representative catalysts are disclosed in: "Handbook of Epoxy Resins", H. Lee and K. Neville, McGraw-Hill Book Company, Inc., New York 1967 and "Epoxy Resins", H. Lee and K. Neville, McGraw-Hill Book Company, Inc., New York 1957, the disclosures of which are incorporated herein by reference.

Basic or acidic catalysts can be used to accelerate the reaction between the reactive polymers and the asphalt. Basic catalysts include, for example, sodium hydroxide. Acidic catalysts include various phosphoric acids including in particular the so-called "polyphosphoric acid" (PPA) and "superpolyphosphoric acid" (SPA) typically having an $H_3PO_4$ equivalent concentration of 105% and greater, as generally known in the art.

Other suitable catalysts for accelerating the reaction of the reactant polymers with asphalt, particularly in promoting the reaction at low temperatures (for example, in the range from of 20 to 100° C.) include organometallic compounds and tertiary amine compounds. Examples of organometallic catalysts include: lead octanoate, lead naphthenate, tetra-sec-butyl titanate, hydrocarbon mono-, or di-, or polycarboxylic acid metallic salts which provide a source of catalytic cations (e.g., $Al^{3+}$, $Cd^{2+}$, $Ca^{2+}$, $Cu^{2+}$, $Fe^{2+}$, $In^{3+}$, $Mn^{2+}$, $Sb^{3+}$, $Sn^{2+}$, and $Zn^{2+}$), e.g.: stannous octanoate, zinc stearate and dibutyltindilaurate. Examples of tertiary amine compounds include a-methylbenzyl dimethylamine, trimethylamine, triethylamine, benzyldimethylamine, dimethylaminomethyl phenol (DMP-10), triethanolamine, tri (hydroxymethyl)aminomethane, s-triazine, m-diethylaminophenol, benzyldimethylamine (BDMA), tri-allylcyanurate, tris(dimethylaminomethyl)phenol (DMP-30), poly(ethylene/dimethylamino ethylmethacrylate), benzyltrimethylammonium hydroxide and tri-2-ethylhexoate salt of tris(dimethylaminomethyl)phenol.

Other accelerators include triphenyl phosphite, ethylene sulfite, and organophosphines (e.g., tricyclohexylphosphine).

Polymers not containing epoxide or anhydride functionalities may be added to the asphalt in addition to the reactant polymers used in this invention. These added polymers may include, but are not limited to, polymers having the composition E/X/Z, where E is derived from ethylene, X is derived from alkyl acrylates, alkyl methacrylates, vinyl esters, or alkyl vinyl ethers. Optionally, Z may be part of the copolymer, wherein Z is derived from carbon monoxide, sulfur dioxide, or acrylonitrile. These copolymers, which do not have asphalt reactive functionality, may have weight ratios of the E/X/Z components in which X is from 5% to 50% of the total copolymer, Z is from 0 to 15% of the total copolymer, E being the remainder. Preferred ratios are those in which X is from 15% to 40% of the total copolymer, Z is from 0 to 10% of the total copolymer, and E being the remainder. These non-reactive diluent polymers can be combined into the asphalt, with the reactant copolymers of this invention, so they comprise from 0% to 18%, preferably from 0 to 15%, and more preferably from 0 to 10% of the final polymer-linked-asphalt composition.

The preferred E/X/Y/Z reactant copolymers used in the present invention can be used either as the principal reactant with an asphalt, or with an additional co-reactant polymer. In this case the preferred reactant copolymer is used to link another copolymer indirectly to asphalt. For example, E/X/Y/Z can be allowed to react with an asphalt for one hour, followed by the addition of a coreactant polymer E/X/N/Z. In another example, useful products can be manufactured in which an epoxy-containing and/or the anhydride-containing polymer and coreactant polymers react with each other after a minor amount of reactive polymers/asphalt reaction has occurred. Such products may be particularly useful in roofing compositions. These coreactant polymers preferably have nucleophilic functionality that can react with the epoxy or glycidyl moiety of E/X/Y/Z. Such nucleophilic functional groups include acids, alcohols, amines and thiols. A preferred coreactant polymer, E/X/N/Z, includes compositions where N is derived from an alkylacrylic acid, acrylic acid, alkyl anhydride, or mono-alkyl maleate. The use of the E/X/N/Z as a coreactant can improve the effectiveness of the E/X/Y/Z asphalt blend.

Preferred weight ratios of the E/X/N/Z copolymer useful as a coreactant with E/X/Y/Z copolymers are X is 0 to 50%, N is 0.5 to 25%, Z is 0 to 15%, E being the remainder.

As indicated above, polymer-linked-asphalt compositions wherein the polymer modifiers include a reactant ethylene/alkyl acrylate/glycidyl methacrylate terpolymer and a high density polyethylene (HDPE)/maleic anhydride (MAH) graft copolymer are known. These compositions are derived from reacting an ethylene/n-butyl acrylate/glycidyl methacrylate (EnBAGMA) copolymer with asphalt and subsequently covalently binding the HDPE-g-MAH copolymer to the asphalt composition. Their impact on asphalt softening point enhancement relies on the melt temperature ($T_m$) of the HDPE-g-MAH copolymer. This melt temperature is limited to a value that approaches that of HDPE homopolymer ($T_m$ is 120° C.). In contrast, the improvement in softening temperature for the polymer-linked-asphalt compositions of this invention is derived from the glass transition temperature ($T_g$) of a styrene/MAH copolymer ($T_g$ is 128° C.). Table A shows a comparison of properties of the maleic anhydride-containing polymers. Heat deflection temperature (HDT) is measured according to ASTM D648.

TABLE A

| Copolymer | $T_g$ | $T_m$ | HDT at 66 psi |
|---|---|---|---|
| HDPE-MAH | Sub-ambient | <120° C. | 88° C. |
| Styrene-MAH | 128° C. | xx | 109° C. |

Examples of polymer-linked-asphalt compositions that are prepared from Frontier 58-22 (an asphalt grade designation referring to the temperature range of 58° C. to −22° C.) asphalt reacted with a reactant ethylene/alkyl acrylate/ glycidyl methacrylate terpolymer, a high-density polyethylene (HDPE)/maleic anhydride (MAH) graft copolymer and a catalyst (PPA) are reported in Table B.

The ethylene/alkyl acrylate/glycidyl methacrylate terpolymer comprise n-butyl acrylate (nBA) as a comonomer. These E/nBA/GMA copolymer materials are designated:

EnBAGMA-1 is 1.4 wt % GMA, 26 wt % nBA and MI=3

EnBAGMA-5 is 5.25 wt % GMA, 28 wt % nBA and MI=12

EnBAGMA-9 is 9 wt % GMA, 25 wt % nBA and MI=8.

Softening point is determined using ASTM D3461 and penetration is determined using ASTM D5 (units reported are deci-millimeter) and the results are also reported in Table B.

TABLE B

| MAH-g-PE wt. % | [EnBAGMA] wt. % | PPA wt. % | Softening point ° C. | Penetration, dmm |
|---|---|---|---|---|
| 3 | EnBAGMA-½% | 0.1 | 86.2 | 55.5 |
| 3 | EnBAGMA-⅓% | 0 | 86.1 | 36.1 |
| 3 | EnBAGMA-⅝% | 0.1 | 81.3 | Not determined |
| 2 | EnBAGMA-½% | 0.2 | 59 | 71.3 |

Uses of the Polymer-Linked-Asphalt Reaction Product

The thermoplastic polymer-linked-asphalt composition of the present invention is useful in various types of asphalt applications including waterproofing and roofing applications. The reaction product may be used neat or in emulsified form. Asphalt emulsions are well known in the roofing art and comprise water, asphalt (including the polymer-linked-asphalt of the present invention) and surfactants.

Roofing applications include use of the thermoplastic polymer-linked-asphalt composition of the present invention in shingles, hot-mop roofing surfaces, membranes and as the asphalt layer in combination with additional fiberglass, polyester or paper layer(s) in built-up roofing.

The advantages of the present invention will be readily apparent from consideration of the following examples. It is understood that these examples are provided for the sake of illustration and comparison only and not as a limitation on the scope of the invention.

EXAMPLES 1 THROUGH 3

Asphalt compositions were prepared using a base asphalt material, Frontier 58-22. Polystyrene/maleic anhydride copolymer containing 7 weight % maleic anhydride that has a Mw of 224,000 and a MI of 1.7 (catalog number 42, 694–6 from Aldrich, Milwaukee, Wis.) was used.

The asphalt was heated to soften it prior to mixing using a Hotpack Oven (Hotpack Corp., Philadelphia, Pa.). Maintaining asphalt temperature during mixing was conducted using a heating mantle (Glas-Col® model TM614 (115 V, 431 W) available from Glas-Col, Terre Haute, Ind.) with an Omega temperature controller. The asphalt was mixed for 15 minutes in a high shear lab mixer (model L1-6464 available from Gifford-Wood Co., Hudson, N.Y.) with a glycidyl-containing ethylene copolymer (EnBAGMA copolymer described above), a polystyrene/maleic anhydride copolymer containing 7 weight % maleic anhydride that has a Mw of 224,000 and an MI of 1.7, and a catalyst to provide Examples 1 through 3 as indicated in Table 1. Comparative Example 1 is the base asphalt without polymer modifiers and Comparative Example 2 is the base asphalt modified with a glycidyl-containing ethylene copolymer (EnBAGMA). The softening points of the compositions were tested with a Mettler FP83 Dropping Point Cell controlled by Mettler FP80 Control Processor and are also reported in Table 1.

TABLE 1

| Composition | EnBAGMA (wt. %) | PS/MAH (wt. %) | Catalyst (wt. %) | Softening point (° C.) |
|---|---|---|---|---|
| Example 1 | EnBAGMA-9 3% | 2 | 0.2 NaOH | 106 |
| Example 2 | EnBAGMA-9 3% | 2 | 0.2 PPA | 88.0 |
| Example 3 | EnBAGMA-9 3% | 3 | 0.2 PPA | 89.2 |
| Comparative Example 1 | 0 | 0 | 0 | 45.1 |
| Comparative Example 2 | EnBAGMA-9 2% | 0 | 0.2 PPA | 57.3 |

EXAMPLES 4 THROUGH 17

Mixing Condition A: Using a high shear mixer (model L1-6464 available from Gifford-Wood Co., Hudson, N.Y.), Asphalt AC10 (a roofing grade asphalt available from Frontier with a viscosity of about 1000 cp) and EnBAGMA were stirred until the EnBAGMA dispersed (about 15 minutes) and the reaction was allowed to continue for 1 to 2 hours. A catalyst was added and the reaction was continued for 30 to 60 minutes. The styrene-MAH polymer was added, the mixing temperature increased to 220° C. and the reaction mixture was stirred for one hour.

Mixing Condition B: Using a high shear mixer (model L1-6464 available from Gifford-Wood Co., Hudson, N.Y.), Asphalt AC10 was heated to 220° C. and styrene-MAH copolymer containing 7 weight % maleic anhydride that has a Mw of 224,000 and an MI of 1.7 was added. The mixture was stirred for 1 hour. EnBAGMA was added and the mixture was stirred until the EnBAGMA dispersed (about 15 minutes). The reaction was allowed to continue for 1 to 2 hours. Basic catalyst was added and the reaction was continued for 30 to 60 minutes.

Examples 4 through 15 used 0.2 wt. % polyphosphoric acid (PPA) as the catalyst. Examples 16 and 17 used 0.15 wt. % NaOH (97% purity NaOH pellets available from Aldrich) as the catalyst.

TABLE 2

| Ex. | EnBAGMA-9 wt. % | PS/MAH wt. % | Mixing Method | Held Overnight at 160° C. | Appearance | Softening Point ° C. | Penetration At 25° C. dmm |
|---|---|---|---|---|---|---|---|
| 4 | 3 | 2 | A | OK | Dull/smooth | 88.4 | 67 |
| 5 | 3 | 3 | A | OK | Dull/smooth | 88.7 | 66.3 |
| 6 | 2 | 3 | A | OK | Dull/smooth | 73.3 | 62.2 |
| 7 | 2 | 2 | A | OK | Dull/smooth | 71.2 | 69.4 |
| 8 | 1 | 4 | A | OK | Smooth | 58.6 | 91.9 |
| 9 | 4 | 1 | A | | Gelled after adding PPA | | |
| 10 | 3 | 2 | B | Very viscous | Dull/smooth | 91.4 | 70.2 |
| 11 | 3 | 3 | B | Very viscous | Dull/smooth | 90.1 | 68 |
| 12 | 2 | 3 | B | OK | Smooth | 69.4 | 78.8 |
| 13 | 2 | 2 | B | OK | Smooth | 72.7 | 73.9 |

TABLE 2-continued

| Ex. | EnBAGMA-9 wt. % | PS/MAH wt. % | Mixing Method | Held Overnight at 160° C. | Appearance | Softening Point ° C. | Penetration At 25° C. dmm |
|---|---|---|---|---|---|---|---|
| 14 | 1 | 4 | B | OK | Smooth | 55.4 | 73.2 |
| 15 | 4 | 1 | B |  | Gelled after adding SPA |  |  |
| 16 | 3 | 2 | A | gelled | Smooth | 92.8 | 93.6 |
| 17 | 3 | 2 | B | gelled | Smooth | 93.1 | 85.2 |

Of note are polymer-linked-asphalt compositions wherein the reactant epoxy-containing ethylene copolymer is an E/X/Y copolymer derived from copolymerization of ethylene, n-butyl acrylate and glycidyl methacrylate (EnBAGMA) comprises 3% of the reaction mixture and the reactant polystyrene-maleic anhydride copolymer comprises 2 to 3% of the reaction mixture (Examples 1, 2, 3, 4, 5, 10, 11, 16 and 17) that exhibit softening points above 85° C. (more particularly above 87° C.).

I claim:

1. A polymer-linked-asphalt composition derived from treating asphalt with a reactant epoxy-containing ethylene copolymer and a reactant polystyrene-maleic anhydride copolymer wherein the cumulative polymer content of said polymer-linked-asphalt composition is from 0.05 to 20 weight percent relative to the total weight of polymers and asphalt.

2. The composition of claim 1 wherein said reactant epoxy-containing ethylene copolymer is a glycidyl-containing polymer.

3. The composition of claim 2 wherein said reactant glycidyl-containing ethylene copolymer is a copolymer represented by the formula E/X/Y/Z, where E is the copolymer unit —(CH$_2$CH$_2$)— derived from ethylene; X is the copolymer unit —(CH$_2$CR$^1$R$^2$)—, where R$^1$ is hydrogen, methyl, or ethyl, and R$^2$ is carboalkoxy, acyloxy, or alkoxy of 1 to 10 carbon atoms (X for example is derived from alkyl acrylates, alkyl methacrylates, vinyl esters, and alkyl vinyl ethers); and Y is the copolymer unit —(CH$_2$CR$^3$R$^4$)—, where R$^3$ is hydrogen or methyl and R$^4$ is carboglycidoxy or glycidoxy (Y for example is derived from glycidyl acrylate, glycidyl methacrylate, or glycidyl vinyl ether) and Z is derived from comonomers including carbon monoxide, sulfur dioxide, acrylonitrile, or other monomers.

4. The composition of claim 3 wherein X is from 0 to 50 weight % of said E/X/Y/Z copolymer, Y is from 0.5 to 15 weight % of said E/X/Y/Z copolymer, and Z is from 0 to 15 weight % of said E/X/Y/Z copolymer, E being the remainder.

5. The composition of claim 2 wherein said reactant glycidyl-containing ethylene copolymer is an E/X/Y copolymer derived from copolymerization of ethylene, n-butyl acrylate and glycidyl methacrylate.

6. The composition of claim 1 wherein said reactant polystyrene-maleic anhydride copolymer contains 0.5 to 40 weight % maleic anhydride.

7. The composition of claim 6 wherein said reactant polystyrene-maleic anhydride copolymer contains 3 to 20 weight % maleic anhydride.

8. The composition of claim 7 wherein said reactant polystyrene-maleic anhydride copolymer contains 5 to 15 weight % maleic anhydride.

9. The composition of claim 1 wherein said reactant epoxy-containing ethylene copolymer comprises 1 to 4 weight percent of the reaction mixture and said reactant polystyrene-maleic anhydride copolymer comprises 1 to 4 weight percent of the reaction mixture.

10. The composition of claim 1 wherein said reactant epoxy-containing ethylene copolymer is an E/X/Y copolymer derived from copolymerization of ethylene, n-butyl acrylate and glycidyl methacrylate comprises 3% of the reaction mixture and said reactant polystyrene-maleic anhydride copolymer comprises 2 to 3% of the reaction mixture.

* * * * *